(12) United States Patent
Chiang et al.

(10) Patent No.: US 7,797,797 B2
(45) Date of Patent: Sep. 21, 2010

(54) WOBBLE-RESISTANT HINGE STRUCTURE

(75) Inventors: Chia Jung Chiang, Sinjhuang (TW); Haung Wen Lee, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 59 days.

(21) Appl. No.: 11/714,515

(22) Filed: Mar. 6, 2007

(65) Prior Publication Data

US 2008/0098566 A1    May 1, 2008

(30) Foreign Application Priority Data

Oct. 31, 2006    (TW) .............................. 95219190 U

(51) Int. Cl.
*E05D 3/10* (2006.01)
(52) U.S. Cl. ...................................................... 16/367
(58) Field of Classification Search ........................ None
See application file for complete search history.

(56) References Cited

U.S. PATENT DOCUMENTS

| | | | | |
|---|---|---|---|---|
| 6,883,206 B2* | 4/2005 | Yang et al. | ..................... | 16/337 |
| 7,055,218 B2* | 6/2006 | Lu et al. | ........................ | 16/367 |
| 7,189,023 B2* | 3/2007 | Kang et al. | .................. | 403/119 |
| 7,222,396 B2* | 5/2007 | Lu et al. | ........................ | 16/340 |
| 7,303,174 B2* | 12/2007 | Li | .......................... | 248/346.06 |
| 2005/0283949 A1* | 12/2005 | Lu et al. | ........................ | 16/367 |
| 2008/0034547 A1* | 2/2008 | Hsu | ............................. | 16/367 |
| 2008/0034549 A1* | 2/2008 | Lee et al. | ....................... | 16/367 |
| 2008/0098568 A1* | 5/2008 | Hsu | ............................. | 16/367 |
| 2008/0204985 A1* | 8/2008 | Bae et al. | ..................... | 361/681 |

* cited by examiner

*Primary Examiner*—Victor Batson
*Assistant Examiner*—Matthew Sullivan
(74) *Attorney, Agent, or Firm*—Guice Patents PLLC

(57) ABSTRACT

The present invention is to provide a wobble-resistant hinge structure, comprising a main frame body having a main plate; a first pivotal axle with one end of its axle rod being inserted with the main plate, at least a resilient plate body with a succession of wave or uneven surface, and a support part, and with the free end of the axle rod being capped, wherein the resilient plate body is disposed with at least a pair of flat portions and the support part corresponding to the flat portions s protrudingly to form a pair of support legs, which are held compressingly against the flat portions and are supported by the main plate, such that the application of external force on the resilient plate body will not result in wobbling.

10 Claims, 4 Drawing Sheets

WOBBLE-RESISTANT HINGE STRUCTURE

FIELD OF THE INVENTION

The present invention relates to a hinge structure and in particular to a hinge structure which can prevent the object be connected, the monitor main body for example, from wobbling.

BACKGROUND OF THE INVENTION

Consumer electronics with flip covers, such as portable computer, electronic dictionary, portable audio/video player, flip mobile phone, generally have a main body on the bottom, which is pivotally connected with the cover body on the top, such that the cover body may swing open or close with respect to the main body. Consequently, the hinge is key to the quality of the products described above.

With rapid change in the 3C electronic products, the conventional art, using at least a first hinge for the pivotal connection between a main body and a cover body to render the cover body rotatable with respect to the main body, does not meet the demand. Consequently, a second hinge is also provided above the first hinge described above by the industry such that the cover body may be rotatable with respect to the main body. ROC Patent Number 573,910, is one of such examples. The invention relates to a pivotal structure and in particular to a pivotal structure which may be applied in an electronic device with a monitor and a main body. Through the rotation relationship between its rotation base and fixed base, the monitor may be rotatable with a limited latitudinal angle. Also, the support legs on the rotation base may also rotatable within a limited longitudinal angle. Consequently, one single pivotal structure can provide users with multiple purposes.

The hinge according to the invention described above comprises a limit plate and a rotation bas, which is then inserted with a spring washer. The hinge is riveted its rotatable end on a gasket disposed at the external side of the spring washer, such that the torsional force resulted from the resilience of the spring washer exerts at the contact face between the limit plate and the main body. Although a single hinge according to the invention described above can provide both horizontal and vertical rotations, the drawback is that the resilience of the spring washer often renders the monitor connected to the-rotation base wobbling as a result, leading to a sense of instability. Consequently, it is an urgent task to provide a new hinge structure to prevent the multi-purpose hinge structure from wobbling from side to side.

SUMMARY OF THE INVENTION

To meet such a demand, the applicant having a long-time experience in designing, production, and marketing of hinge proposes the present invention, a wobble-resistant hinge structure, as a result of numerous trials and experiments.

An object of the present invention is to provide a wobble-resistant hinge structure, comprising a main frame body having a main plate; a first pivotal axle with one end of its axle rod being inserted with the main plate, at least a resilient plate body with a succession of wave or uneven surface, and a support part, and with the free end of the axle rod being capped, wherein the resilient plate body is disposed with at least a pair of flat portions and the support part corresponding to the flat portions is protrudingly to form a pair of support legs, which are held compressingly against the flat portions and are supported by the main plate, such that the application of external force on the resilient plate body will not result in wobbling.

Another object of the present invention is to provide a wobble-resistant hinge structure, wherein the horizontal main plate of the main frame body extends downwardly from its edge to form a vertical side plate; the free end of the axle rod on one end of the pivotal axle is capped on a horizontal rotation frame and the rod ring on the other end is disposed with a pair of flat indented faces; further comprises a second pivotal axle having an axle rod with its one end being inserted with the side plate to be rotatably connected to a frame and the other end sidewardly protruding to form two pressing tenons, between which a guided channel is formed; consequently, the two pressing tenons of the axle rod are held compressingly against one indented face of the axle ring to render the first pivotal axle into a locked state; on the other hand, when the rotation frame and the main frame body are flipped to a specific angle on the first pivotal axle, the rod ring moves to be accommodated in the guided channel so as to release the pivotal axle form the locked state and thus vertical rotation is possible.

Yet another object of the present invention is to provide a wobble-resistant hinge structure, further comprising a third pivotal axle which is inserted through its central rod with the connection hole of the connection plate corresponding to the side plate, an intermediate ring, and a horizontal frame hole of a frame, and finally is capped on its end.

Still yet another object of the present invention is to provide a wobble-resistant hinge structure, wherein a pressing ring has the same shape of the rod ring, a rod neck is disposed between the pressing ring and the rod ring, and a pair of indented flat faces are formed on the pressing ring to render the pressing tenon pressing against the two indented faces when the pressing tenon is in a non-operating closed state.

Still another object of the present invention is to provide a wobble-resistant hinge structure, wherein the main plate is bored to have an axle hole, the axle rod of the first pivotal axle adjacent to the main frame body is inserted with a positioning plate and corresponding to a pair of radial slots is protrudingly disposed with two radial plate tenons such that the positioning plate is rotated to render the two plate tenons slipping into the two radial slots; the main plate is bored to have an axle hole, the circumference of which is protrudingly formed to have two end tenons to establish the required rotation angle, the axle rod of the first pivotal axle adjacent to the main plate of the main frame body is inserted first with a driven plate and then a stop plate, the stop plate radially protrudes to form a fan-shaped stop tenon, and the circumference of the driven plate protrudes downwardly to form two driving tenons; when the driven plate is rotated, one of the driving tenon will push one end of its adjacent stop tenon and thus the stop plate will rotate accordingly until the other end of the stop tenon contacts an end tenon, which is the limit of the rotation.

Still yet another object of the present invention is to provide a wobble-resistant hinge structure, wherein the side plate is bored to have a side hole, the circumference of which is radially formed to have a pair of tenon slots, the axle rod of the second pivotal axle is inserted with an auxiliary plate between the side plate and the frame, and the auxiliary plate is protrudingly disposed with a connection tenon corresponding to the two tenon slots, respectively; such that when the main frame body is rotated, the two connection tenons will slip into the two tenon slots, which amounts to the main frame body is rotated to a specific angle with respect to the second pivotal axle; also, the side plate is bored to have a side hole, the circumference of which is formed to have a stopper, the axle rod of the second pivotal axle is inserted with an limit plate between the side plate and the frame, and the limit plate is formed to have two bulgings according to the required flip angle; such that when the main frame body is rotated, a stop action will be encountered when the stopper contacts either of the bulgings during the rotating course; furthermore, the auxiliary plate is formed to have an indented portion to accommodate the limit plate.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
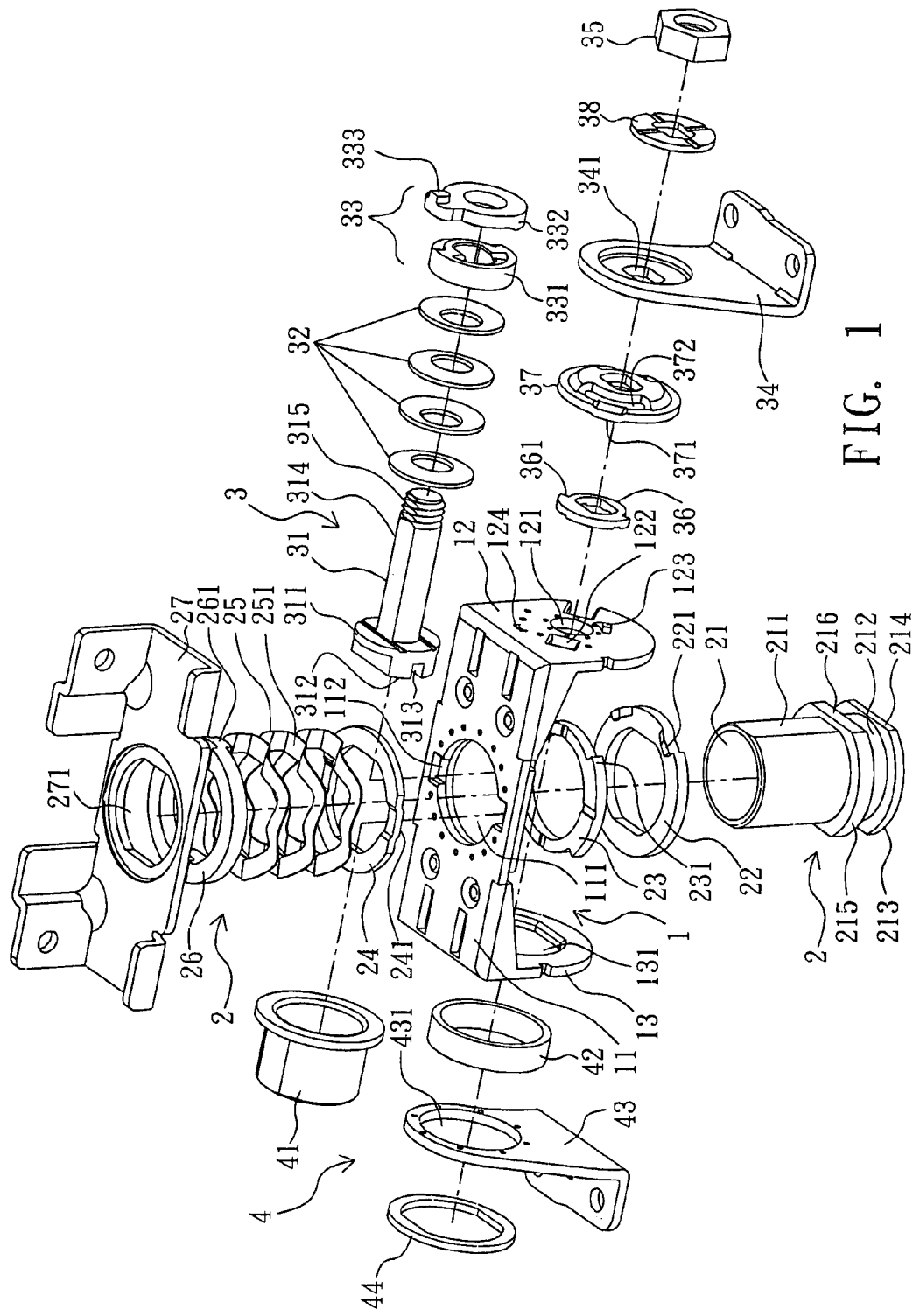
FIG. 1 schematically illustrates a perspective view of the hinge structure according to the present invention.
Figure 2:
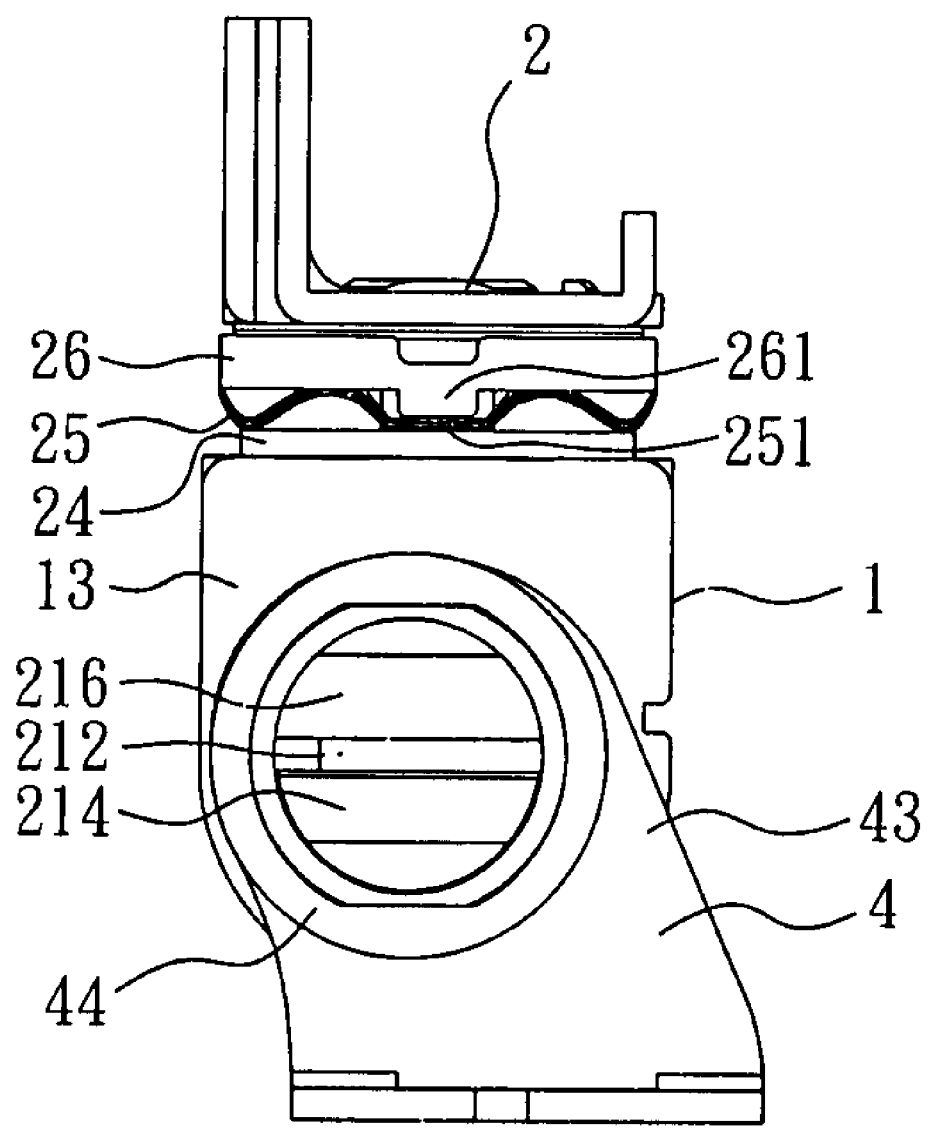
FIG. 2 schematically illustrates a side view of the hinge structure according to the present invention.

With reference to FIGS. 1 and 2, the hinge structure according to the present invention comprises a main frame body 1 and a first pivotal axle 2, wherein the main frame body 1 is formed by stamping and bending a metal frame to have a horizontal main plate 11 integratedly extending from its edge downwardly to form a vertical side plate 12 such that the main frame body 1 has a L shape for the pivotal connection of the first pivotal axle 2 and a second pivotal axle 3 described later. However, the shape of the main frame body 1 is not limited to the L shape. As shown in the figures, it can also be a shape of inverse U, of which a vertical connection plate 13 is disposed at the opposite side of the vertical plate 12 for the pivotal connection of a third pivotal axle 4. For the insertion of the axle rod 21 of the first pivotal axle 2, the main plate 11 is bored to have an axle hole 111, the circumference of which is formed to have two face-to-face radial slots 112 at opposite top surface and protrudingly disposed with two end tenons (not shown due to the angle of projection) to establish the required rotation angle at its bottom circumference. For the insertion of the axle rod 31 of the second pivotal axle 3, the side plate 12 is bored to have a side hole 121, the circumference of which is radially formed to have a pair of tenon slots 122, a stopper 123, and an insertion hole 124.

The first pivotal axle 2 is a hollow axle rod 21 inserted with, in the order from the bottom of the main frame body 1, a driven plate 22, a stop plate 23, the axle hole 111 of the main plate 11, a positioning plate 24, at least a resilient plate body 25 with a succession of wave or uneven surface, and a support part 26, and finally the free end of the axle rod 21 is rivetedly secured with the through hole 271 of a rotation frame 27. As shown in the figures, the axle rod 21 is radially disposed with at least a milling face 211 such that it may form a mechanical linkage with the driven plate 22, the positioning plate 24, and the rotation frame 27.

The axle rod 21 at its lower end is disposed with a rod neck 212, the lower portion of which is integratedly connected with a larger rod ring 213, which is further disposed a pair of indented flat faces 214 face-to-face, so as to press against the two pressing tenons 312 sidewardly protruding from the axle ring 311 described later. Furthermore, to form a stable pressing action, a pressing ring 215 having the same shape of the rod ring 213 is disposed over the rod neck 212, and a pair of indented flat faces 216 are formed on the pressing ring 215 to render the pressing tenon 312 pressing against the two indented faces 214 and 216 when the pressing tenon 312 is in a non-operating state.

Also, the circumference of the driven plate 22 is at least protrudingly disposed with a driving tenon 221 and the stop plate 23 radially protrudes to form a fan-shape stop tenon 231 such that when the driven plate 22 rotates, one of the driving tenon 221 push one end of the adjacent stop tenon 231 to render the stop plate 23 moving accordingly until the other end of the stop tenon 231 contacts an end tenon disposed on the circumference of the axle hole 111, which is the limit of the rotation. On the other hand, the returning action can be achieved by an inverse operation: the other driving tenon 221 is to push the other end of the stop tenon 231 until the other end of stop tenon 231 contacts the other end tenon.

Also, the positioning plate 24 radially protrudes to form a pair of face-to-face plate tenons 241 downwardly, which are retained with the radial slot 112, respectively. When the positioning plate 24 is rotated to render the two plate tenons 241 slipping into the radial slots, a characteristic of distinct steps can be sensed tactilely.

Figure 3:
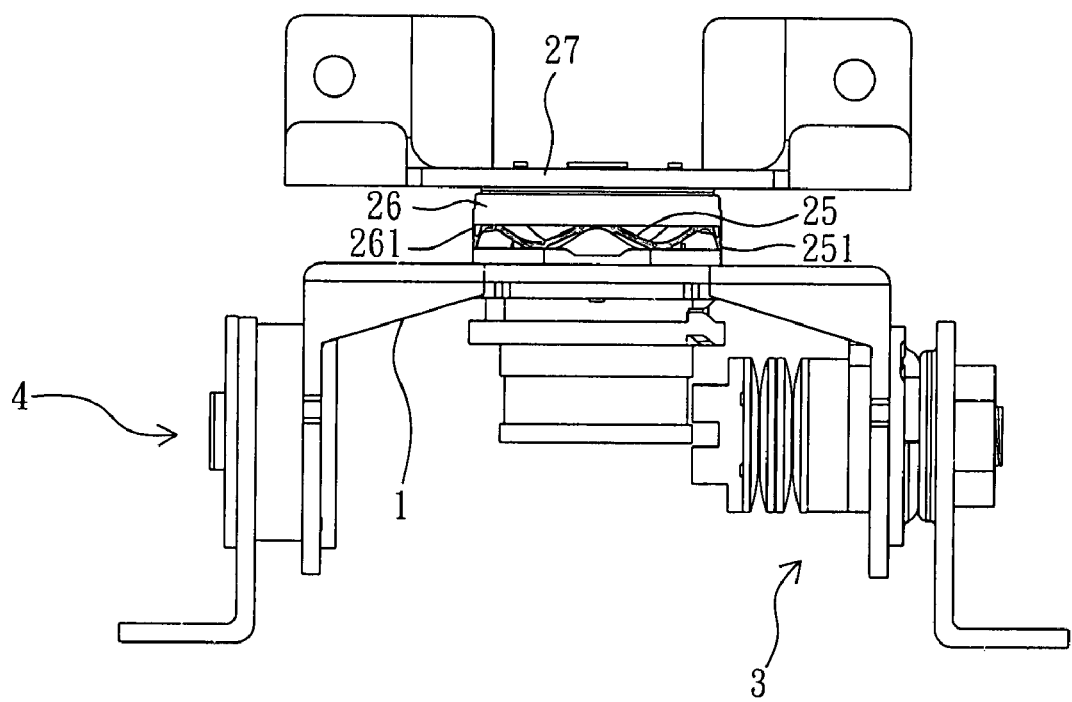
FIG. 3 schematically illustrates a front view of the hinge structure according to the present invention.
Figure 4:
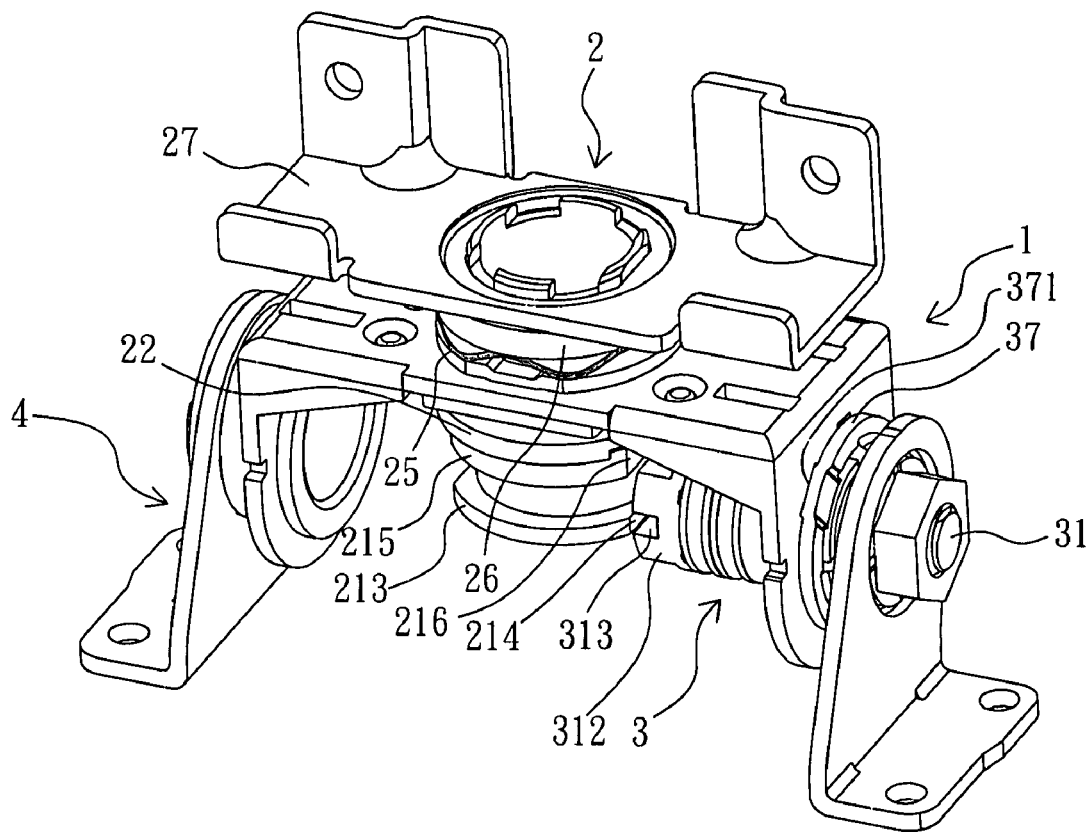
FIG. 4 schematically illustrates a perspective assembly view of the hinge structure according to the present invention.

Furthermore, the preferred embodiment of the resilient plate body 25 is a wave spring; however, the distinct feature different from the conventional art is that at least a pair of flat portions 251 are formed on the resilient plate body 25 and the support part 26 corresponding to the flat portions 251 is protrudingly to form a pair of support legs 261, which are held compressingly against the flat portions 251. With reference to FIGS. 3 and 4, a plurality of the wave resilient plate bodies 25 may also provide axially elastic compression. Nevertheless, since at least a pair of the flat portions 251 are held compressingly against the corresponding support legs 261 of the support part 26, the object, the monitor main body for example, connected with the rotation frame 27 can be supported to avoid wobbling from side to side.

The second pivotal axle 3 is pivotally connected onto the side plate 12 of the main frame body 1, wherein an axle rod 31 is inserted with at least a resilient body 32, a cam set 33, the side hole 121 of the side plate 12, and a horizontal frame hole 341 of a L-shaped frame 34 and then a connection part 35, a lock nut for example, is placed on the free end of the axle rod 31 to integratedly connect the parts described, achieving the pivoting function. The rod ring 311 on the inner end of the axle rod 31 protrudes sidewardly to form two pressing tenons 312, between which a guided channel 313 is formed.

Also, the axle rod 31 is disposed with at least a milling face 314 on its surface and a connection section 315, a screw for example, on its free end. The preferred embodiment of the resilient body 32 may be a spring, wave spring, or plate spring. The cam set 33 is a conventional art, wherein the corresponding motion between the convex and concave portions of a movable part 331 and a fastening part 332 is incorporated with the compression or extension of the resilient body 32 to render the main frame body 1 having the autolocking function with respect to the frame 34, and the fastening part 332 is engaged onto the insertion hole 124 of the side plate 12 by a radially protruding insertion tenon 333, which is a conventional art and will not be discussed here furthermore.

Furthermore, the main frame body 1 may be rotated under an externally applied force and, to limit its rotation angle, the axle rod 31 is inserted with a limit plate 36 between the side plate 12 and the frame 34 such that two bulgings 361 formed on the limit plate 36 can establish the required rotation angle. Consequently, during the rotating course of the main frame body 1, a stop action will be encountered when the stopper 123 contacts either of the bulgings 361. To clearly show that the vertical first pivotal axle 2 is rotatable, the axle rod 31 is inserted with an auxiliary plate 37 between the side plate 12 and the frame 34 and the auxiliary plate 37 is protrudingly disposed with a connection tenon 371 corresponding to the two tenon slots 122 of the side plate 12, respectively, such that when the main frame body 1 rotates, the two connection tenons 371 slip into the two tenon slots 122 to create a characteristic of distinct steps, which can remind users that t the first pivotal axle 2 is vertically rotatable. The auxiliary plate 37 is disposed with an indented portion 372 to accommodate the limit plate 36 described earlier. Also, a gasket 38 is disposed between the frame 34 and the connection part 35.

Furthermore, the main frame body 1 is connected with a third pivotal axle 4 at its one end corresponding to the second pivotal axle 3. The third pivotal axle 4 is inserted through its central rod 41 with the connection hole 131 of the connection plate 13 corresponding to the side plate 12, an intermediate ring 42, and a horizontal frame hole 431 of the L-shaped frame 43. The central rod 41 is riveted at its end and integratedly connected with the inserted parts described earlier to achieve the pivoting function. As shown in the figures, a connection ring 44 is disposed outside the frame 43 to be riveted with the central rod 41.

After the parts described earlier according to the present invention are assembled, the at least one pair of flat portions 251 of the wave resilient plate bodies 25 are being held compressingly against and supported by the one pair of support legs 261 of the support part 26 to avoid wobbling. Furthermore, the two frames 34 and 43 are connected onto the main body, the main console for example; the rotation frame 27 and the cover body, the monitor main body for example, are connected. When the main body and cover body are in a closed position (0 degree), the perspective view is shown in FIG. 4. At this time, the two pressing tenon 312 of the axle rod 31 are held compressingly against the rod ring 213 and the two indented faces 214 and 216 of the pressing ring 215 to render the first pivotal axle un-rotatable. When the rotation frame 27 is flipped open, the main frame body 1 will rotate at the same time such that the cover body may achieve the opening and closing functions with respect to the main body, which may be applied in notebook computers for example. On the other hand, during the rotating course of the main frame body 1, the two tenon slots 122 of the side plate 12 are aligned with the connection tenons 371 of the auxiliary plate 37 so as to form a butting connection, indicating that it has been rotated to a specific degree (90 degrees). At this time, the rod ring 213 moves to be accommodated in the guided channel 313 so as to be released from the locked state and thus vertical rotation is possible. Further more, the limit of rotation may be achieved by the corresponding movement of the driven plate 22, stop plate 23, and two end tenons. The rotation angle according to present invention is, for example, 180 degrees such that a hinge structure which may be rotated open and closed horizontally and rotating at specific angles vertically can be achieved.

Consequently, with the implementation of the present invention, it can indeed prevent an axial tandem hinge from causing the connected object, the monitor main body for example, to be wobbling from side to side when there is no resilient body present. To avoid wobbling, it is only required to form a compressing connection by at least a resilient body and a support part and to use a support leg of a support part as a support, which is not seen in the conventional art.

While the invention has been described with reference to the a preferred embodiment thereof, it is to be understood that modifications or variations may be easily made without departing from the spirit of this invention, which is defined by the appended claims.

What is claimed is:

1. A wobble-resistant hinge structure, comprising:
   a main frame body having a main plate;
   a first pivotal axle with one end of an axle rod being inserted through the main plate, at least a resilient plate body, and a support part, and with the free end of the axle rod being capped on a rotation frame, wherein the resilient plate body has wave-like curved surface portions and at least a pair of flat portions located between the wave-like curved surface portions and the support part has a pair of support legs protruding downwardly from a bottom thereof and corresponding to the flat portions of the resilient plate body, the pair of support legs being compressed against the pair of flat portions of the resilient plate body and being located between the main plate and the rotation frame.

2. The wobble-resistant hinge structure as claimed in claim 1, wherein the resilient plate body is a wave spring.

3. The wobble-resistant hinge structure as claimed in claim 1, wherein the main plate of the main frame body extends downwardly from an edge thereof to form a side plate extending vertically; the free end of the axle rod on one end of the pivotal axle is capped on the rotation frame and a rod ring on the other end is disposed with a pair of flat indented faces; further comprises a second pivotal axle having an axle rod with one end thereof being inserted with the side plate to be rotatably connected to a frame and the other end sidewardly protruding to form two pressing tenons, between which a guided channel is formed; consequently, the two pressing tenons of the axle rod are held compressingly against one indented face of an axle ring to render the first pivotal axle into a locked state; on the other hand, when the rotation frame and the main frame body are flipped to a specific angle by the first pivotal axle, the rod ring moves to be accommodated in the guided channel so as to release the pivotal axle form the locked state and thus a vertical rotation is possible.

4. The wobble-resistant hinge structure as claimed in claim 3, further comprises a third pivotal axle having a central rod inserted through a connection hole of a connection plate corresponding to the side plate, an intermediate ring, and a horizontal frame hole of a frame, and finally is capped on an end thereof.

5. The wobble-resistant hinge structure as claimed in claim 3, wherein a pressing ring has the same shape of the rod ring, a rod neck is disposed between the pressing ring and the rod ring, and a pair of indented flat faces are formed on the pressing ring to render the pressing tenon pressing against the two indented faces when the pressing tenon is in a non-operating closed state.

6. The wobble-resistant hinge structure as claimed in claim 1, wherein the main plate is bored to have an axle hole, the axle rod of the first pivotal axle adjacent to the main frame body is inserted with a positioning plate and corresponding to a pair of radial slots is protrudingly disposed with two radial plate tenons such that the positioning plate is rotated to render the two plate tenons slipping into the two radial slots.

7. The wobble-resistant hinge structure as claimed in claim 1, wherein the main plate is bored to have an axle hole, the circumference of which is protrudingly formed to have two end tenons to establish the required rotation angle, the axle rod of the first pivotal axle adjacent to the main plate of the main frame body is inserted first with a driven plate and then a stop plate, the stop plate radially protrudes to form a fan-shaped stop tenon, and the circumference of the driven plate protrudes downwardly to form two driving tenons; when the driven plate is rotated, one of the driving tenon will push one end of an adjacent stop tenon and thus the stop plate will rotate accordingly until the other end of the stop tenon contacts an end tenon, which is the limit of the rotation.

8. The wobble-resistant hinge structure as claimed in claim 3, wherein the side plate is bored to have a side hole, the circumference of which is radially formed to have a pair of tenon slots, the axle rod of the second pivotal axle is inserted with an auxiliary plate between the side plate and the frame, and the auxiliary plate is protrudingly disposed with a connection tenon corresponding to the two tenon slots, respectively; such that when the main frame body is rotated, the two connection tenons will slip into the two tenon slots, which amounts to the main frame body is rotated to a specific angle with respect to the second pivotal axle.

9. The wobble-resistant hinge structure as claimed in claim 3, wherein the side plate is bored to have a side hole, the circumference of which is formed to have a stopper, the axle rod of the second pivotal axle is inserted with a limit plate between the side plate and the frame, and the limit plate is formed to have two bulgings according to the required flip angle; such that when the main frame body is rotated, a stop action will be encountered when the stopper contacts either of the bulgings during the rotating course.

10. The wobble-resistant hinge structure as claimed in claim 8, wherein the auxiliary plate is formed to have an indented portion to accommodate the limit plate.

* * * * *